United States Patent
Koshimizu et al.

(10) Patent No.: US 11,323,976 B2
(45) Date of Patent: May 3, 2022

(54) NETWORK DEVICE AND RADIO COMMUNICATION METHOD

(71) Applicant: NTT DOCOMO, INC., Tokyo (JP)

(72) Inventors: Takashi Koshimizu, Tokyo (JP); Irfan Ali, Istanbul (TR); Riccardo Guerzoni, Munich (DE); Jari Mutikainen, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/611,660

(22) PCT Filed: May 8, 2018

(86) PCT No.: PCT/JP2018/017774
§ 371 (c)(1),
(2) Date: Nov. 7, 2019

(87) PCT Pub. No.: WO2018/207775
PCT Pub. Date: Nov. 15, 2018

(65) Prior Publication Data
US 2020/0154388 A1    May 14, 2020

(30) Foreign Application Priority Data
May 8, 2017   (JP) .............................. JP2017-092642

(51) Int. Cl.
*H04W 8/08*     (2009.01)
*H04W 60/00*     (2009.01)
(Continued)

(52) U.S. Cl.
CPC ........... *H04W 60/005* (2013.01); *H04W 8/08* (2013.01); *H04W 68/005* (2013.01); *H04W 88/06* (2013.01)

(58) Field of Classification Search
CPC ... H04W 60/005; H04W 8/08; H04W 68/005; H04W 88/06; H04W 8/22; H04W 60/00
See application file for complete search history.

(56) References Cited

U.S. PATENT DOCUMENTS 10,966,270 B2 *   3/2021   Takahashi ............. H04W 48/18
11,219,095 B2 *   1/2022   Xu ........................ H04W 76/14
(Continued)

FOREIGN PATENT DOCUMENTS

WO     2013152477 A1    10/2013

OTHER PUBLICATIONS

Office Action issued in the counterpart Japanese Patent Application No. 2019-517636, dated Sep. 8, 2020 (8 pages).
(Continued)

*Primary Examiner* — Julio R Perez
(74) *Attorney, Agent, or Firm* — Osha Bergman Watanabe & Burton LLP

(57) ABSTRACT

A radio communication method according to the present invention supports Dual registration in which the same UE (50) is simultaneously registered on 4G and 5G. The radio communication method includes the UE (50) requesting connection to EPC and transmitting, to the 4G, Attach Request that includes Dual registration indication that indicates that the UE (50) has been dually registered, and MME (100) that constitutes the 4G notifying, after the Attach Request has been acquired, HSS (110) of the Dual registration indication that indicates that the UE (50) has been dually registered.

4 Claims, 11 Drawing Sheets

(51) Int. Cl.
*H04W 68/00* (2009.01)
*H04W 88/06* (2009.01)

(56) References Cited

U.S. PATENT DOCUMENTS

| | | | |
|---|---|---|---|
| 2015/0024748 A1 | 1/2015 | Zhang et al. | |
| 2017/0164234 A1* | 6/2017 | Kalapatapu | H04W 28/08 |
| 2018/0288657 A1* | 10/2018 | Stojanovski | H04W 36/0022 |
| 2019/0037417 A1* | 1/2019 | Lei | H04W 72/085 |
| 2020/0045767 A1* | 2/2020 | Velev | H04W 8/24 |
| 2020/0137787 A1* | 4/2020 | Lin | H04W 72/048 |
| 2021/0076438 A1* | 3/2021 | Lee | H04W 76/15 |
| 2021/0195507 A1* | 6/2021 | Zhu | H04W 76/15 |
| 2021/0400613 A1* | 12/2021 | Surisetty | H04L 65/1073 |

OTHER PUBLICATIONS

NTT Docomo; "Interworking between NGC and EPC" 3GPP TSG-SA WG2 #119, S2-170934; Feb. 7, 2017 (22 pages).
NTT Docomo; SA WG2 Meeting #120, S2-172244; "TS 23.502: Registration and PDU session establishment procedures changes for EPS to NGS idle mode mobility" Mar. 27-31, 2017; Busan, South Korea (12 pages).
NTT Docomo; 3GPP TSG-SA WG2 Meeting #121, S2-173321; "Capturing Dual Registration Procedures between EPC and 5GC" May 15-19, 2017; Hangzhou, China (23 pages).
3GPP TS 23.501 V0.4.0; "3rd Generation Partnership Project; Technical Specification Group Services and System Aspects; System Architecture for the 5G System; Stage 2 (Release 15)" Apr. 2017 (123 pages).
International Search Report issued in International Application No. PCT/JP2018/017774, dated Jun. 19, 2018 (4 pages).
Written Opinion issued in International Application No. PCT/JP2018/017774; dated Jun. 19, 2018 (4 pages).
Extended European Search Report issued in counterpart European Patent Application No. 18799233.4, dated Mar. 23, 2020 (10 pages).
NTT Docomo; "23.501: Dual Registration Mobility"; SA WG2 Meeting #121, S2-173319; Hangzhou, China; May 15-19, 2017 (10 pages).
NTT Docomo, Ericsson; "Handling of MME and AMF registration in HSS+UDM for IWK"; SA WG2 Meeting #122bis, S2-176142; Sofia-Antipolis, France; Aug. 21-25, 2017 (5 pages).
Office Action issued in the counterpart European Patent Application No. 18799233.4, dated Jun. 22, 2021 (7 pages).
Office Action issued in counterpart Chinese Application No. 201880030088.8 dated Oct. 27, 2021 (17 pages).

* cited by examiner

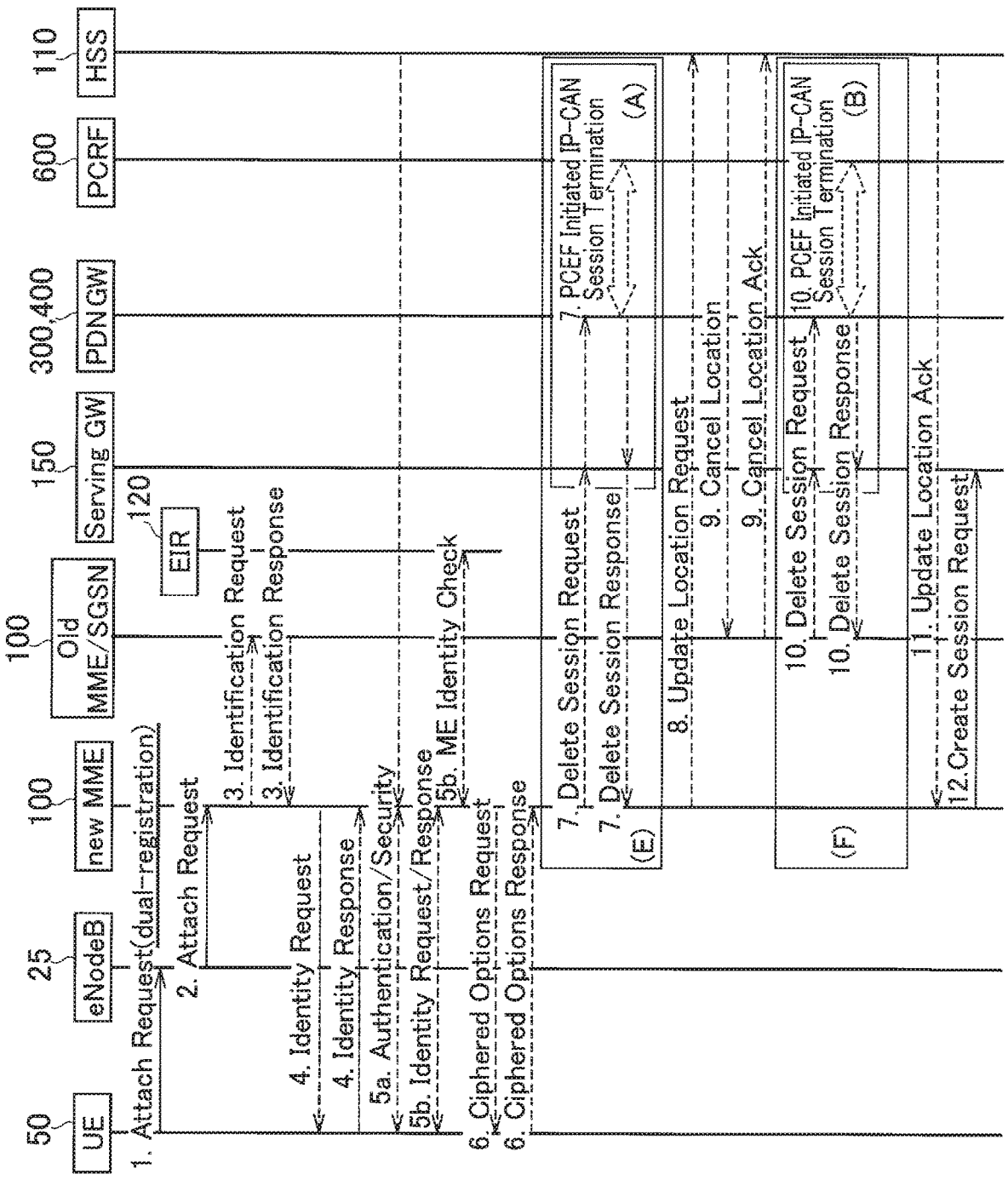

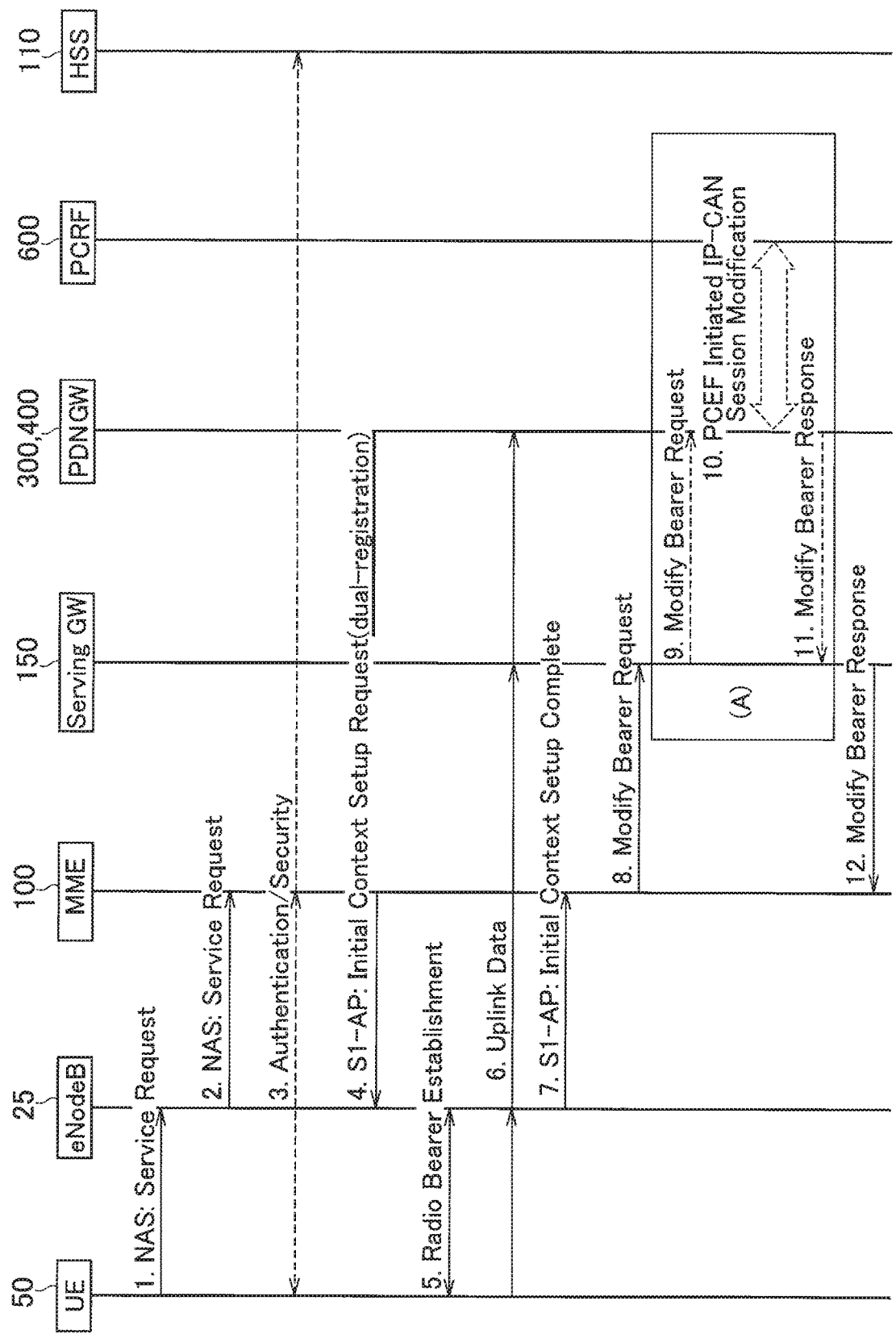

NETWORK DEVICE AND RADIO COMMUNICATION METHOD

TECHNICAL FIELD

The present invention relates to a network device and a radio communication method that support Dual registration in which the same user device is simultaneously registered in a plurality of radio communication networks.

BACKGROUND ART

3rd Generation Partnership Project (3GPP) specifies Long Term Evolution (LTE), and with an aim of further speeding, specifies LTE-Advanced (hereinafter, it is assumed that 4G includes the LTE-Advanced). Moreover, in the 3GPP, specifications of a successor system of the LTE (hereinafter, referred to as 5G) called 5G New Radio (NR) and the like are being studied.

In such 5G specifications, dually registering a user device (User Equipment, UE) simultaneously in the 4G (specifically, Evolved Packet Core (EPC)) and the 5G (specifically, 5G Core (5GC)) (Dual registration) has been agreed upon (for example, Non-Patent Document 1).

Because, a state in which the UE is simultaneously registered in the EPC and the 5GC is allowed in the Dual registration, UE context can be arbitrarily transferred between the EPC and the 5GC as per the necessity. Accordingly, in the Dual registration mode, it is considered that new services can be supported flexibly.

PRIOR ART DOCUMENT

Non-Patent Document

Non-Patent Document 1: 3GPP TS 23.501 V0.4.0 Section 5.17.2.3 Mobility in dual-registration mode, 3rd Generation Partnership Project; Technical Specification Group Services and System Aspects; System Architecture for the 5G System; Stage 2 (Release 15), 3GPP, April 2017

SUMMARY OF THE INVENTION

However, the Dual registration explained above has the following problems. For example, if the UE has been dually registered, when the UE performs the existing attach procedure to attach to the EPC, the 5GC is notified that the UE is attached to the EPC.

Moreover, in the existing attach procedure, when notified that the UE is attached to the EPC, a network device that constitutes 5GC (Access and Mobility Management Function (AMF)) deletes the UE context (specifically, Session Management (SM) context) in the 5GC, and cancels the registration of the UE in the 5GC. Similarly, another network device that constitutes the 5GC, too, cancels the registration of the UE in the 5GC, and the IP level connectivity of the UE in the 5GC gets canceled.

A similar problem occurs even when the UE performs the existing attach procedure to attach to the 5GC in a state in which the UE is dually registered.

The present invention has been made in view of the above circumstances. One object of the present invention is to provide a network device and a radio communication method capable of maintaining Dual registration more reliably while utilizing an attach procedure of an existing user device when the Dual registration in which the network device is simultaneously registered in the EPC and the 5GC is applied.

A network device according to one aspect of the present invention is a network device (MME 100, AMF 200) that constitutes a radio communication system (radio communication system 10) that supports dual registration in which same user device (UE 50) is simultaneously registered on a first communication network (e.g., EPC) and a second communication network (e.g., 5GC) having a different communication scheme than that of the first communication network. The network device includes a connection processing unit (attach processing unit 101) that acquires via the first communication network a message (Attach Request, Registration Request) through which the user device requests to connect to the first communication network; and a registration processing unit (UE registration processing unit 103) that notifies, after the massage has been acquired by the connection processing unit, another network device (HSS 110, UDM 500) or the user device a dual registration indication (Dual registration indication) that indicates that the user device has been dually registered.

A network device according to another aspect of the present invention is a network device that constitutes a radio communication system that supports dual registration in which same user device is simultaneously registered on a first communication network and a second communication network having a different communication scheme than that of the first communication network. The network device includes a connection processing unit that acquires via the first communication network a message through which the user device requests to connect to the first communication network; and a registration processing unit that stops notifying another network device of a connection indication (Initial Attach Indicator) that indicates that the user device is connected to the first communication network, when the user device has been dually registered and the connection processing unit has acquired the message.

A radio communication method according to still another aspect of the present invention is a radio communication method that supports dual registration in which same user device is simultaneously registered on a first communication network and a second communication network having a different communication scheme than that of the first communication network. The radio communication method includes requesting including the user device requesting connection to the first communication network and transmitting to the first communication network a message that includes a dual registration indication that indicates that the user device has been dually registered; and notifying including the first communication network notifying, after the massage has been acquired, another network device of the dual registration indication that indicates that the user device has been dually registered.

A radio communication method according to still another aspect of the present invention is a radio communication method that supports dual registration in which same user device is simultaneously registered on a first communication network and a second communication network having a different communication scheme than that of the first communication network. The radio communication method includes requesting including the user device requesting connection to the first communication network and transmitting to the first communication network a message that includes a dual registration indication that indicates that the user device has been dually registered; and stopping including the first communication network stopping, after the massage has been acquired, the notification to another network device of a connection indication that indicates that the user device is connected to the first communication network.

BRIEF DESCRIPTION OF DRAWINGS

FIG. 6A is a diagram showing a communication sequence in which E-UTRAN 20 is notified that the UE 50 has been dually registered (Operation Example 3) (Part 1).

FIG. 7 is a diagram showing a communication sequence in which the E-UTRAN 20 is notified that the UE 50 has been dually registered (Operation Example 4).

MODES FOR CARRYING OUT THE INVENTION

Figure 1:
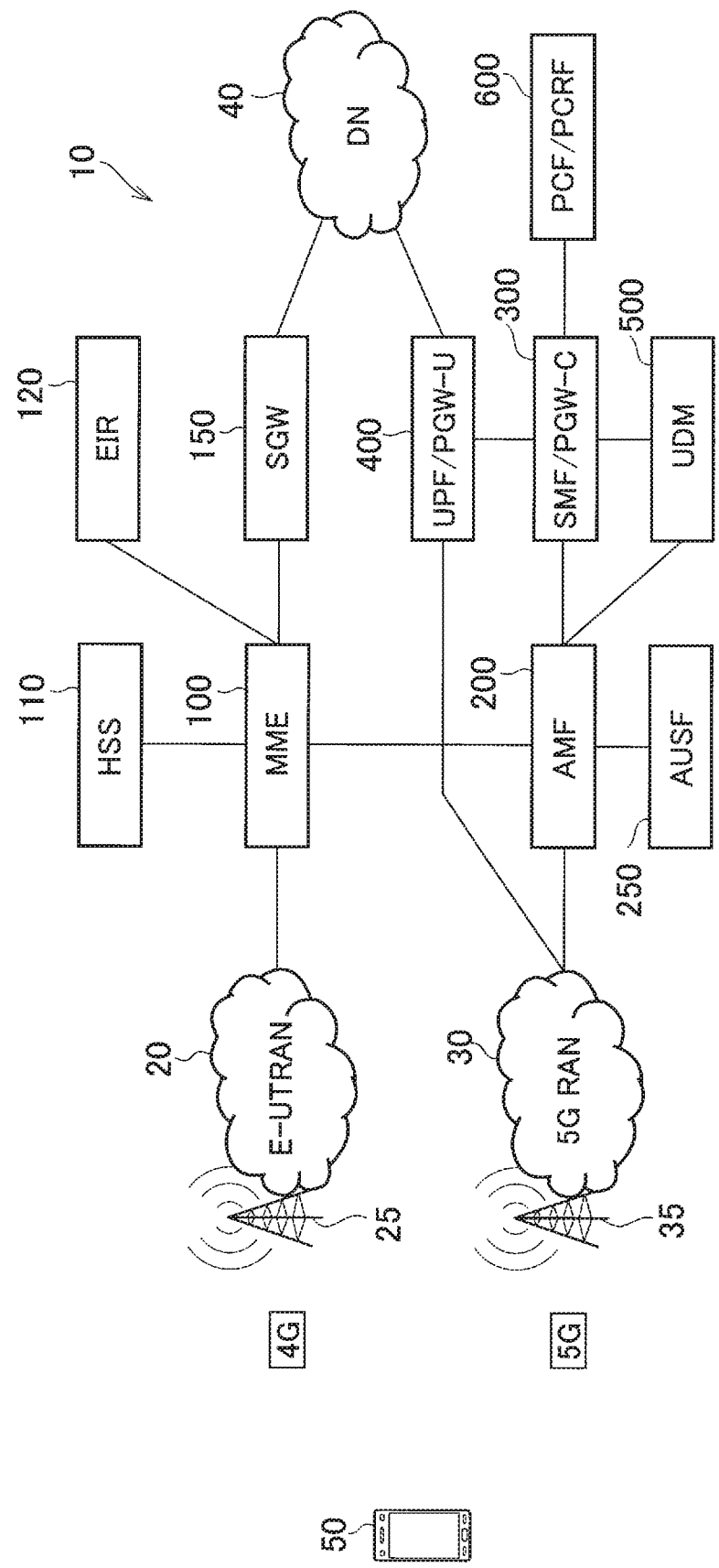
FIG. 1 is an overall structural diagram of a radio communication system 10.

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system. 10 supports a plurality of radio communication schemes. Specifically, the radio communication system 10 is constituted by a plurality of the radio communication systems that varies in the radio communication schemes.

More specifically, as shown in FIG. 1, the radio communication system 10 is constituted by a radio communication system in accordance with 4G and a radio communication system in accordance with 5G.

The "4G" is a radio communication system in accordance with Long Term Evolution (LTE), and includes an Evolved Universal Terrestrial Radio Access Network 20 (hereinafter, "E-UTRAN 20"), a Mobility Management Entity 100 (hereinafter, "MME 100"), a Home Subscriber Server 110 (hereinafter, "HSS 110"), an Equipment Identity Register 120 (hereinafter, "EIR 120"), a Serving Gateway 150 (hereinafter, "SGW 150"), and the like.

The "5G" is a successor system of the LTE called New Radio (NR) and the like, and includes a 5G Radio Access Network 30 (hereinafter, "5G RAN 30"), an Access and Mobility Management Function 200 (hereinafter, "AMF 200"), an Authentication Server Function 250 (hereinafter, "AUSF 250"), a Session Management Function/PDN Gateway-C plane 300 (hereinafter, "SMF/PGW-C 300"), a User Plane Function 400 (hereinafter, "UPF/PGW-U 400"), a Unified Data Management 500 (hereinafter, "UDM 500"), a Policy Control Function/Policy and Charging Rules Function 600 (hereinafter, "PCF/PCRF 600"), and the like. The configuration of nodes that constitute the 5G shown in FIG. 1 is in accordance with the standards stipulated in 3GPP TS 23.501 and the like.

A Data Network 40 (hereinafter, "DN 40") is connected to the SGW 150 and the UPF/PGW-U 400. An IP network such as the Internet is connected to the DN 40.

In FIG. 1, however, only the nodes (devices) relating to the present invention are shown. As it can be clearly understood from the names, the SMF/PGW-C 300, the UPF/PGW-U 400, and the PCF/PCRF 600 are explained so because it is assumed that the 4G functions (PGW-C, PGW-U, PCRF), too, would expand in the future and develop so as to function as the 5G. The HSS 110 and the UDM 500 can be integrated and referred to as HSS/UDM.

Moreover, the "4G" can be referred to as the LTE (including LTE-Advanced), and the "5G" can be referred to as the New Radio (NR) and the like. Furthermore, a node group at the 4G core network side excluding the E-UTRAN 20 can be referred to as the Evolved Packet Core (EPC). A node group at the 5G core network side excluding the 5G RAN 30 can be referred to as the 5G Core (5GC).

The E-UTRAN 20 includes a radio base station 25. The radio base station 25 can be referred to as eNB (eNode B). The 5G RAN 30 includes a radio base station 35. The radio base station 35 can be referred to as gNB (gNode B).

A user device 50 (hereinafter, "UE 50") supports the 4G and the 5G. In other words, the UE 50 executes radio communication in accordance with the 4G with the radio base station 25, and executes radio communication in accordance with the 5G with the radio base station 35.

Moreover, the UE 50 performs handover between the 4G and the 5G. In other words, the UE 50 can perform handover from the 4G to the 5G and from the 5G to the 4G.

In the present embodiment, the radio communication system 10 supports Dual registration in which the same UE 50 is simultaneously registered in the EPC and the 5GC. The Dual registration is stipulated in Clause 5.17.2.3 of 3GPP TS 23.501 V0.4.0 and the like.

In the present embodiment, the EPC can constitute a first communication network, and the 5GC having a different communication scheme than that of the EPC can constitute a second communication network. Conversely, the 5GC can constitute the first communication network and the EPC can constitute the second communication network.

(2) Functional Block Configuration of Radio Communication System

A functional block configuration of the radio communication system 10 is explained below. Specifically, functional block configurations of the UE 50, the MME 100, and the AMF 200 are explained below.

(2.1) UE 50

Figure 2:
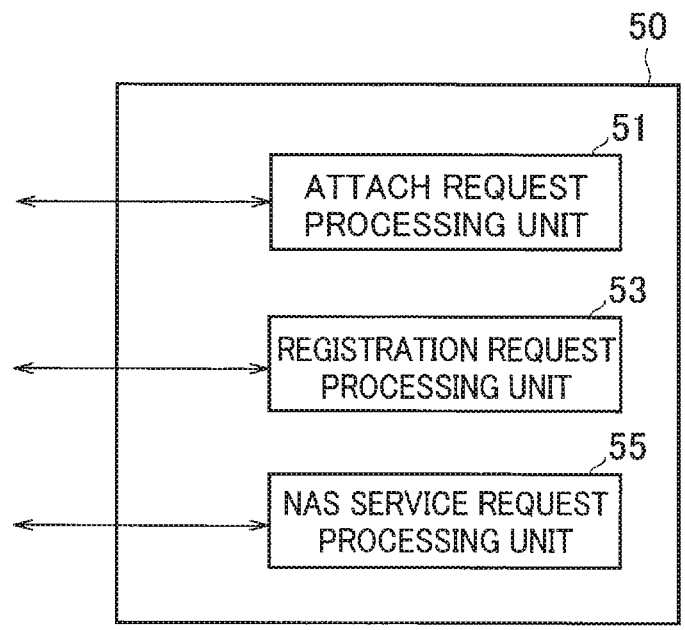
FIG. 2 is a functional block diagram of UE 50.

FIG. 2 is a functional block diagram of the UE 50. As shown in FIG. 2, the UE 50 includes an attach request processing unit 51, a registration request processing unit 53, and a NAS service request processing unit 55.

The attach request processing unit 51 executes an attach procedure for the 4G, more specifically, for the EPC. Specifically, the attach request processing unit 51 executes an attach procedure that is stipulated in Clause 5.3.2.1 of 3GPP TS 23.401 and the like.

More specifically, the attach request processing unit 51 transmits to the EPC Attach Request via the E-UTRAN 20. That is, the attach request processing unit 51 transmits the Attach Request with respect to the radio base station 25.

The attach request processing unit 51 can include in the Attach Request Dual registration indication that indicates that the UE 50 has been dually registered (hereinafter, "Dual registration") in the EPC and the 5GC. In other words, the Attach Request is a message, which denotes that the attach to the EPC is requested, and can include Dual registration indication that indicates that the UE 50 has been dually registered in the EPC and the 5GC.

However, the Dual registration indication can be indicated by a 1-bit flag or a plurality of bits (bytes) that explicitly indicate the Dual registration of the UE 50.

When the UE 50 attempts to transit from the 5GC to the EPC while the UE 50 has been dually registered, the attach request processing unit 51 can transmit the Attach Request explained above.

The registration request processing unit 53 executes the attach procedure for 5G, specifically, the 5GC. Specifically, the registration request processing unit 53 executes an attach procedure that is stipulated in Clause 4.2.2.2 of 3GPP TS 23.502 and the like. That is, the attach procedure for the 5GC is a combination of the Attach procedure and the Tracking Area Update procedure in the EPC, and referred to as registration procedure.

More specifically, the registration request processing unit 53 transmits Registration Request to the 5GC via the 5G RAN 30. That is, the registration request processing unit 53 transmits the Registration Request to the radio base station 35.

The registration request processing unit 53 can include, in the Registration Request, the Dual registration indication that indicates that the UE 50 has been dually registered. In other words, the Registration Request is a message that denotes that the attach to the 5GC is requested, and can include the Dual registration indication that indicates that the UE 50 has been dually registered.

When the UE 50 attempts to transit from the EPC to the 5GC while the UE 50 has been dually registered, the registration request processing unit 53 can transmit the Registration Request explained above.

The NAS service request processing unit 55 executes a process relating to a service request in the NAS (Non-Access Stratum) layer. The NAS layer is a function layer in the protocol stack between the UE 50 and the core network (EPC, 5GC).

Specifically, the NAS service request processing unit 55 executes a service request procedure that is stipulated in Clause 5.3.4.1 of 3GPP TS 23.401 and the like (in the case of a service request with respect to the EPC). Moreover, the NAS service request processing unit 55 executes the service request procedure stipulated in Clause 5.3.4.1 of 3GPP TS 23.502 and the like (in the case of a service request with respect to the 5GC).

More specifically, the NAS service request processing unit 55 transmits NAS Service Request to the EPC via the E-UTRAN 20. That is, the NAS service request processing unit 55 transmits the NAS Service Request to the radio base station 25.

Moreover, the NAS service request processing unit 55 transmits the NAS Service Request to the 5GC via the 5G RAN 30. That is, the NAS service request processing unit 55 transmits the NAS Service Request to the radio base station 35.

(2.2) MME 100 and AMF 200

Figure 3:
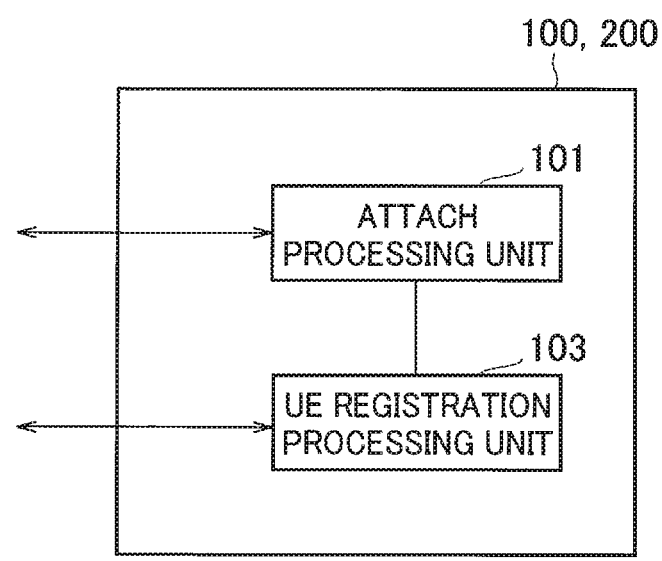
FIG. 3 is a functional block diagram of MME 100.

FIG. 3 is a functional block diagram of the MME 100. As shown in FIG. 3, the MME 100 includes an attach processing unit 101 and a UE registration processing unit 103. A functional block configuration of the AMF 200 is similar to that of the MME 100. In the present embodiment, the MME 100 and the AMF 200 constitute a network device. Functions of each block are explained below by citing the MME 100 as an example, unless the AMF 200 is explicitly mentioned. Concerning functions of each block of the AMF 200 that are different from that of the MME 100 will be mainly explained.

The attach processing unit 101 executes an attach procedure with the UE 50. Specifically, the attach processing unit 101 acquires via the 4G (E-UTRAN 20) the Attach Request (message) through which the UE 50 requests attach (connection) to the 4G (here, equivalent to the first communication network).

However, in the case of the AMF 200, the attach processing unit 101 acquires the Registration Request via 5G (5G RAN 30). In the present embodiment, the attach processing unit 101 constitutes a connection processing unit.

The "attach" means that the UE 50 is configured to as to be able to execute radio communication via the E-UTRAN 20 or the 5G RAN 30, and such a configuration includes security and bearer configuration processing and the like relating to the UE 50.

The UE registration processing unit 103 executes registration of the UE 50 in the EPC. In the present embodiment, the UE registration processing unit 103 constitutes a registration processing unit.

Particularly, in the present embodiment, in response to acquiring the Attach Request by the attach processing unit 101, the UE registration processing unit 103 can notify another network device of the Dual registration indication that indicates that the UE 50 has been dually registered. Specifically, the UE registration processing unit 103 can notify the HSS 110 of the Dual registration indication.

In the case of the AMF 200, the UE registration processing unit 103 can notify the UDM 500 of the Dual registration indication. Furthermore, in the case of the AMF 200, the UE registration processing unit 103 can also notify the UE 50 of the Dual registration indication. Specifically, the UE registration processing unit 103 notifies the UE 50 of the Dual registration indication by including the Dual registration indication in the Registration Accept that is transmitted to the UE 50.

Moreover, instead of the Dual registration indication notification explained above, when the UE 50 has been dually registered and the attach processing unit 101 has acquired the Attach Request, the UE registration processing unit 103 can stop notifying another network device of Initial Attach Indicator (connection indicator) that indicates that the UE 50 is attached (connected) to the 4G/EPC. Specifically, the UE registration processing unit 103 stops notifying the HSS 110 of the Initial Attach Indicator. In other words, the UE registration processing unit 103 does not transmit the Initial Attach Indicator to the HSS 110.

Similarly, even in the case of the AMF 200, when the UE 50 has been dually registered and the attach processing unit 101 has acquired the Registration Request, the UE registration processing unit 103 can stop notifying the UDM 500 of the Initial Attach Indicator.

Moreover, upon receiving the NAS Service Request from the UE 50 via the radio base station 25 while the UE 50 has been dually registered, the UE registration processing unit 103 can notify the radio base station 25 of the Dual registration indication that indicates that the UE 50 has been dually registered.

Specifically, the UE registration processing unit 103 transmits to the radio base station 25 an Initial Context Setup Request that includes the Dual registration indication.

However, in the case of the AMF 200, upon receiving the NAS Service Request from the UE 50 via the 5G RAN 30 (radio base station 35) while the UE 50 has been dually registered, the UE registration processing unit 103 transmits to the 5G RAN 30 (radio base station 35) an N2 Request that includes the Dual registration indication.

(3) Operation of Radio Communication System

Operation of the radio communication system 10 is explained below. Specifically, operations of the radio communication system 10 relating to the Dual registration in which the same UE 50 is simultaneously registered in the EPC and the 5GC will be explained.

More specifically, the attach procedure that is performed when the UE 50 attempts to transit from the 5GC to the EPC or from the EPC to the 5GC while the UE 50 has been dually registered will be explained (Operation Examples 1 and 2). However, in the case of the UE 50 attempting to transit from the EPC to the 5GC, as explained above, the registration procedure in which the Attach procedure and the Tracking Area Update procedure in the EPC are combined is explained.

Furthermore, operations in which the E-UTRAN 20 or the 5G RAN 30 are notified that the UE 50 has been dually registered will be explained (Operation Examples 3 to 6).

(3.1) Operation Example 1 (Transitioning from 5GC to EPC)

Figure 4A:
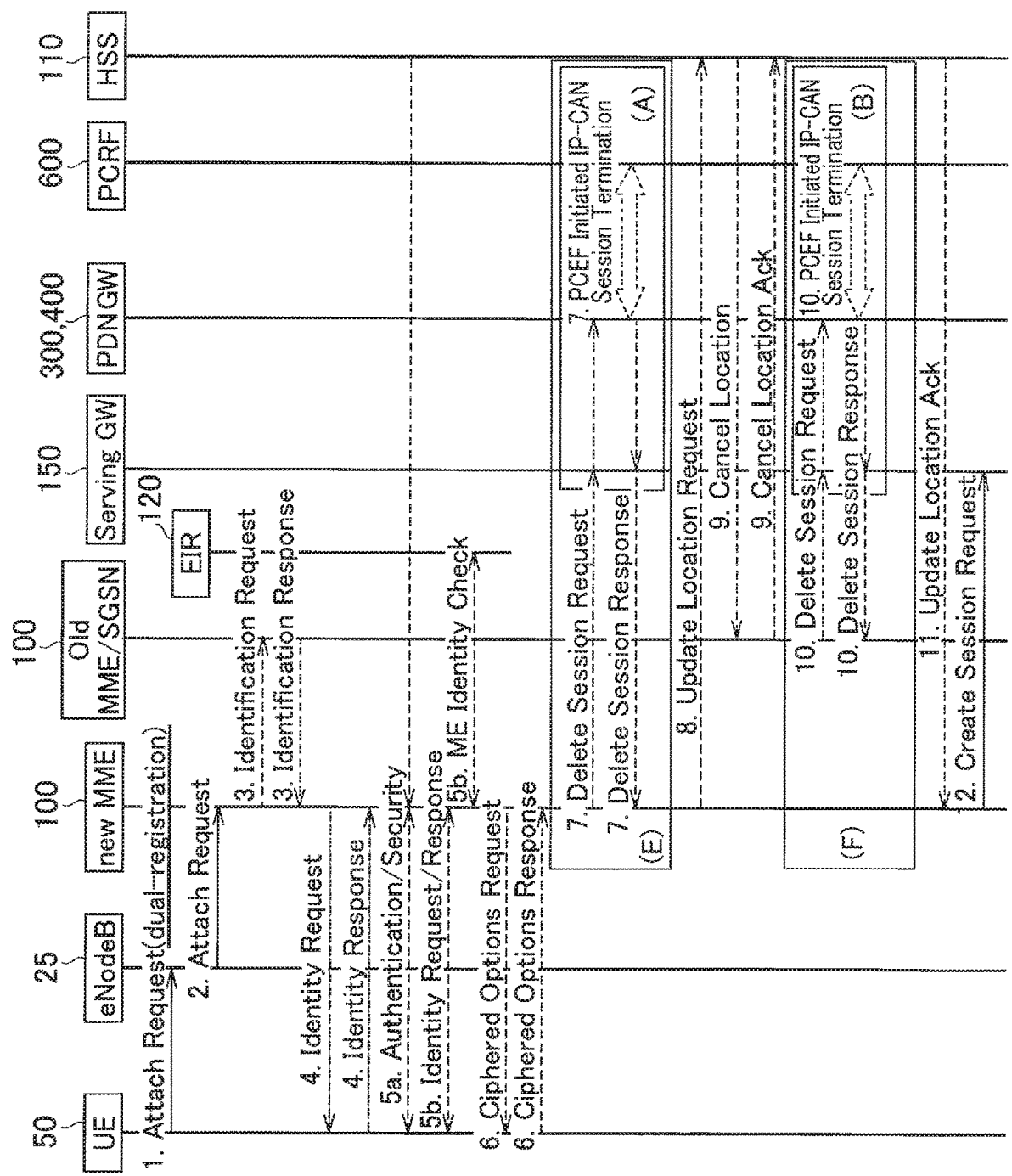
FIG. 4A is a diagram showing a communication sequence that is performed when the UE 50 attempts to transit from 5GC to EPC while the UE 50 has been dually registered (Operation Example 1) (Part 1).
Figure 4B:
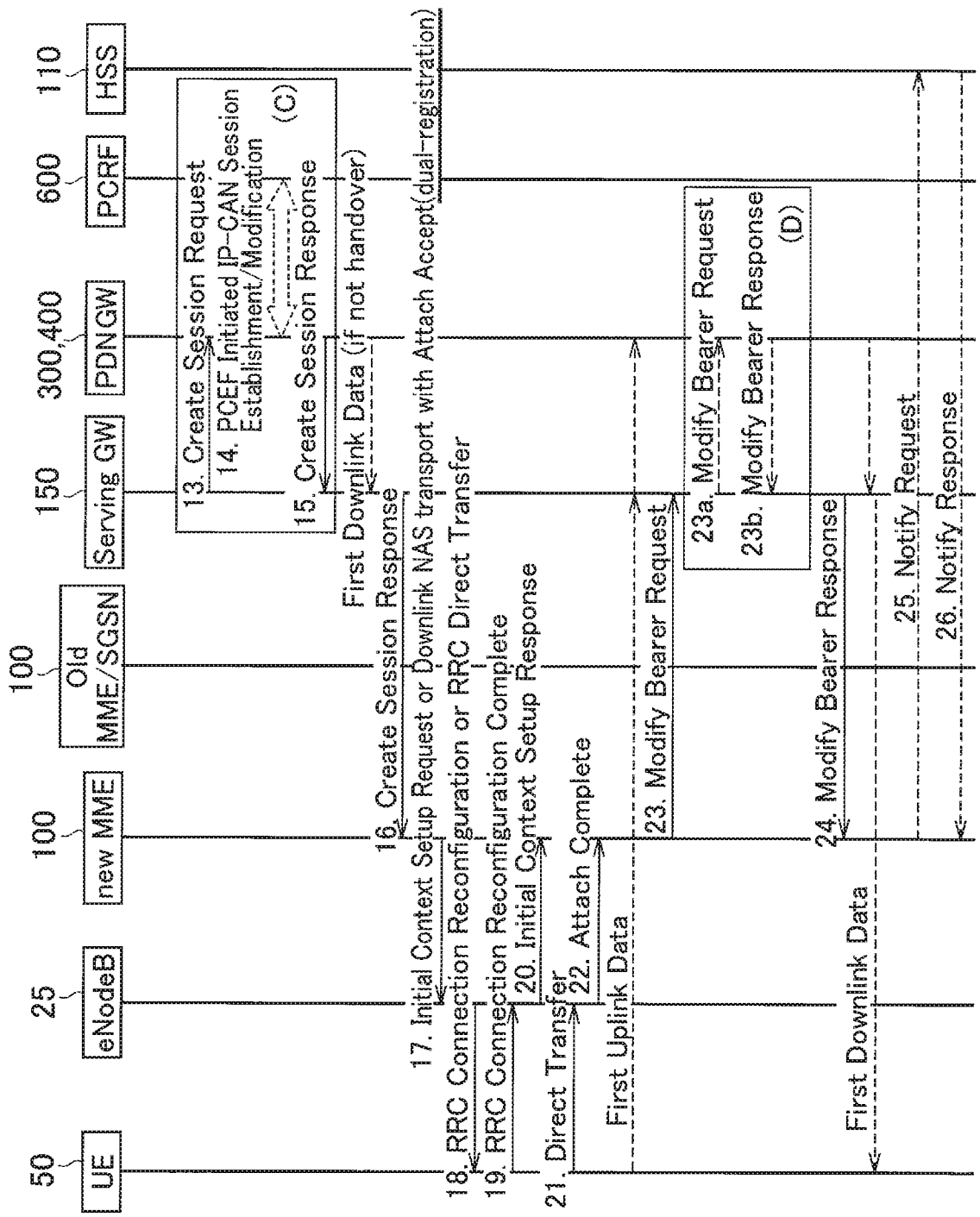
FIG. 4B is a diagram showing a communication sequence that is performed when the UE 50 attempts to transit from the 5GC to the EPC in the state in which the UE 50 has been dually registered (Operation Example 1) (Part 2).

A communication sequence that is performed when the UE 50 attempts to transit from the 5GC to the EPC while the UE 50 has been dually registered (Operation Example 1) is shown in FIGS. 4A and 4B. The communication sequence shown in FIGS. 4A and 4B is similar to that of the attach procedure stipulated in Clause 5.3.2.1 of 3GPP TS 23.401 and the like, and a part of the procedure that is different from this attach procedure will be mainly explained below.

The UE 50 transmits to the radio base station 25 (eNode B) the Attach Request that includes the Dual registration indication (Step 1).

Upon receiving the Attach Request, the MME 100 (new MME) transmits to the HSS 110 Update Location Request that includes the Dual registration indication (Step 8). However, the MME 100 can transmit the Update Location Request that includes the Dual registration indication only when allowing the Dual registration of the UE 50. In other words, the MME 100 does not necessarily have to allow Dual registration of the UE 50.

Moreover, instead of transmitting the Update Location Request that includes the Dual registration indication, the MME 100 can stop notifying the HSS 110 of the Initial Attach Indicator that indicates (that is, denotes; hereinafter the same) that the UE 50 is attached to the 4G/EPC. That is, it is allowable if the MME 100 does not include the Initial Attach Indicator in the Update Location Request.

Accordingly, the HSS 110 does not perform the processes (Cancel Location and Delete Session) explained at Steps 9 and 10 shown in FIG. 4A. Furthermore, the HSS 110 also does not transmit the Cancel Location to the AMF 200 (not shown in FIGS. 4A and 4B). Accordingly, the registration in the UE 50 in the AMF 200 and the SMF/PGW-C 300 is maintained.

Moreover, the MME 100 transmits to the radio base station 25 Initial Context Setup Request that includes the Dual registration indication or Downlink NAS transport with Attach Accept (Step 17).

The Dual registration indication indicates that the UE 50 has been dually registered in the EPC and the 5GC. In the present operation example, the UE 50 transfers Session Management (SM) context of the UE 50 from the 5GC to the EPC. Specifically, the UE 50 includes a handover indication that is included in PDN Connection Request (not shown in FIGS. 4A and 4B) and transfers the SM context to the EPC. Accordingly, the continuity of the IP address on the PDN connection side can be maintained.

When the core network does not support the Dual registration and starts normal processing, the UE 50 does not transfer the SM context, but, configures a new PDN connection in the EPC.

Moreover, when attached to the 5GC, the UE 50 can recognize whether the radio communication system 10 (EPC and 5GC) supports the Dual registration. Accordingly, the UE 50 can execute processing relating to the attach in which the Dual registration is assumed.

(3.2) Operation Example 2 (Transitioning from EPC to 5GC)

Figure 5:
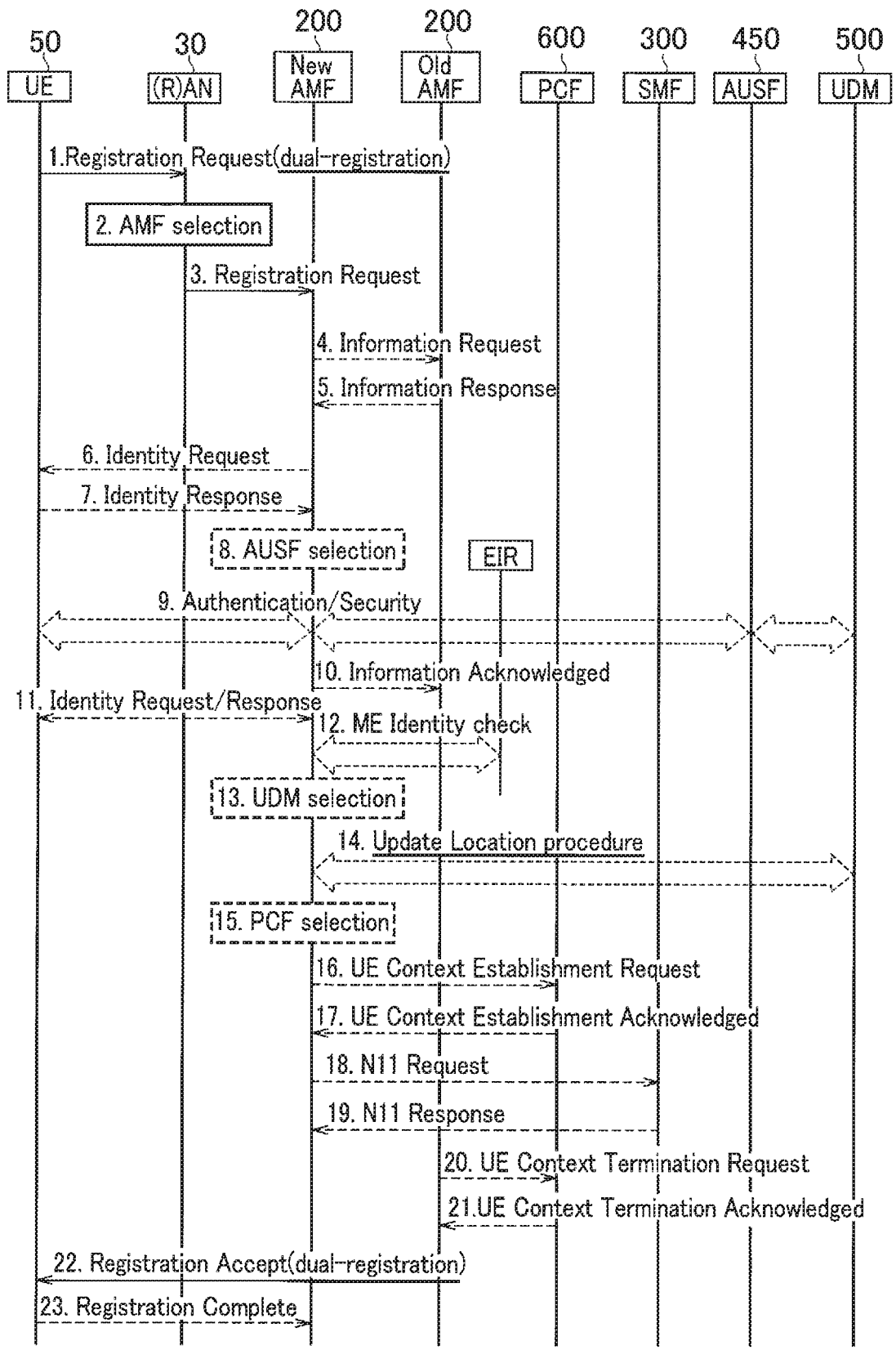
FIG. 5 is a diagram showing a communication sequence that is performed when the UE 50 attempts to transit from the EPC to the 5GC in the state in which the UE 50 has been dually registered (Operation Example 2).

A communication sequence that is performed when the UE 50 attempts to transit from the EPC to the 5GC in the state in which the UE 50 has been dually registered (Operation Example 2) is shown in FIG. 5. The communication sequence shown in FIG. 5 is similar to that of the attach procedure (registration procedure) stipulated in Clause 4.2.2.2 of 3GPP TS 23.502 and the like. A part of the communication sequence that is different from the attach procedure is mainly explained below, and a part that is similar to the operation example explained above is appropriately omitted.

The UE 50 transmits to the 5G RAN 30 the Registration Request that includes the Dual registration indication (Step 1).

Upon receiving the Registration Request, during the Update Location Procedure, the AMF 200 (new AMF) transmits to the UDM 500 the Dual registration indication (Step 14). Alternatively, the AMF 200 can transmit the Dual registration indication only when allowing the Dual registration of the UE 50.

Moreover, instead of transmitting the Dual registration indication, the AMF 200 can stop notifying the UDM 500 of the Initial Attach Indicator that indicates that the UE 50 is attached to the 4G/EPC. In other words, it is allowable that the AMF 200 does not notify the UDM 500 of the Initial Attach Indicator.

Accordingly, the UDM 500 does not transmit the Cancel Location of the UE 50 to the MME 100 (not shown in FIG. 5). Accordingly, the registration of the UE 50 in the EPC such as the MME 100 is maintained.

Moreover, the AMF 200 transmits to the UE 50 the Registration Accept that includes the Dual registration indication via the 5G RAN 30 (Step 22).

(3.3) Operation Example 3 (Notifying E-UTRAN 20 of Dual Registration)

As explained above, in Operation Examples 3 to 6, operations in which the E-UTRAN 20 or the 5G RAN 30 is notified that the UE 50 has been dually registered are explained below.

It can be assumed that, in the core network (EPC and 5GC), the Single registration in which UE is allowed to register on either the EPC or the 5GC is applied to a specific UE, and the Dual registration is applied to another UE. In other words, a situation in which, in the core network, one UE to which Single registration is applied and another UE to which the Dual registration is applied coexist can be assumed.

Because, when such UEs coexist, the radio access network, specifically, the processing and operation of the E-UTRAN 20 and the 5G RAN 30 with respect to the UEs vary, whether the handover needs to be performed (in the case of Single registration), or whether the handover need not be performed (in the case of Dual registration) must be determined based on the capability of the networks (including radio access network and core network). In other words, it is so because, in the case of Dual registration, it is only necessary to create a session in the transition destination radio access network, and handover processing of the UE 50 between the E-UTRAN 20 and the 5G RAN 30 is not necessary.

In such a case, in Operation Examples 3 to 6, the E-UTRAN 20 and the 5G RAN 30 are notified that the UE 50 has been dually registered. Accordingly, the E-UTRAN 20 and the 5G RAN 30 can respectively determine whether to apply the Dual registration to the UE 50.

Figure 6B:
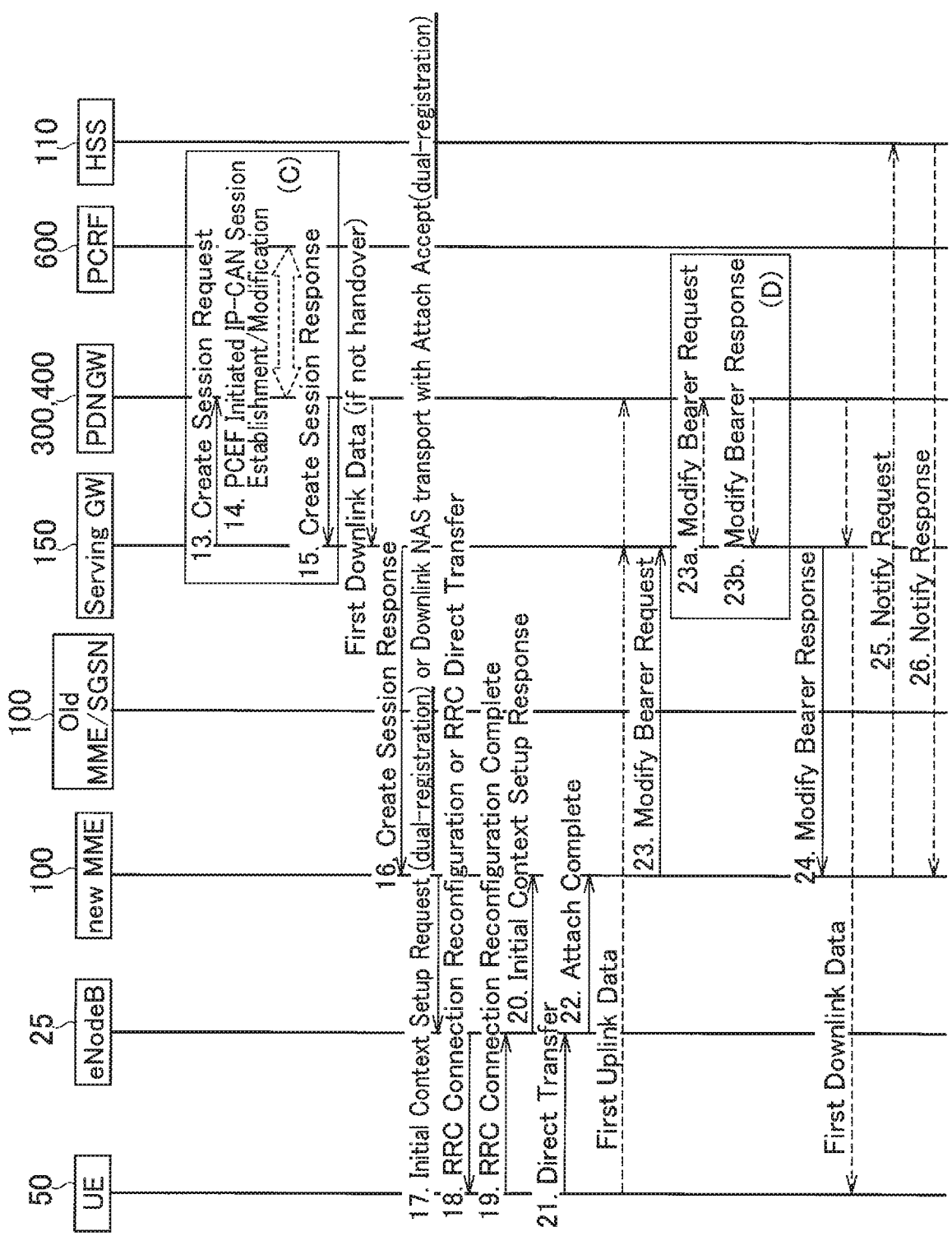
FIG. 6B is a diagram showing a communication sequence in which the E-UTRAN 20 is notified that the UE 50 has been dually registered (Operation Example 3) (Part 2).

A communication sequence in which E-UTRAN 20 is notified that the UE 50 has been dually registered (Operation Example 3) is shown in FIGS. 6A and 6B. The communication sequence shown in FIGS. 6A and 6B is similar to that of the attach procedure stipulated in Clause 5.3.2.1 of 3GPP TS 23.401 and the like. A part of the communication sequence that is different from the attach procedure is mainly explained below, and a part that is similar to the operation examples explained above is appropriately omitted.

An operation in which the UE 50 transmits the Attach Request that includes the Dual registration indication is similar to that explained in Operation Example 1.

Operation Example 2 differs from Operation Example 1 on a point that, at Step 17, the MME 100 explicitly transmits to the radio base station 25 the Initial Context Setup Request that includes the Dual registration indication.

In this manner, when the MME 100 transmits to the radio base station 25 the Initial Context Setup Request that includes the Dual registration indication, the E-UTRAN 20 (radio base station 25) recognizes that the UE 50 has been dually registered, and does not perform the handover of the UE 50. On the other hand, if the Dual registration indication is not included in the Initial Context Setup Request, the E-UTRAN 20 (radio base station 25) recognizes that Single registration is applied to the UE 50, and performs the handover of the UE 50.

(3.4) Operation Example 4 (Notifying E-UTRAN 20 of Dual Registration)

A communication sequence in which the E-UTRAN 20 is notified that the UE 50 has been dually registered (Operation Example 4) is shown in FIG. 7. The communication sequence shown in FIG. 7 is similar to that of the service request procedure stipulated in Clause 5.3.4.1 of 3GPP TS 23.502 and the like. A part of the communication sequence that is different from the service request procedure is mainly explained below, and a part that is similar to the operation examples explained above is appropriately omitted.

As shown in FIG. 7, the MME 100 transmits to the radio base station 25 the Initial Context Setup Request (51-AP message) that includes the Dual registration indication (Step 4).

Accordingly, when the MME 100 transmits to the radio base station 25 the Initial Context Setup Request that includes the Dual registration indication, the E-UTRAN 20 (radio base station 25) recognizes that the UE 50 has been dually registered, and does not perform the handover of the UE 50 (similar to Operation Example 3).

(3.5) Operation Example 5 (Notifying 5G RAN 30 of Dual Registration)

Figure 8:
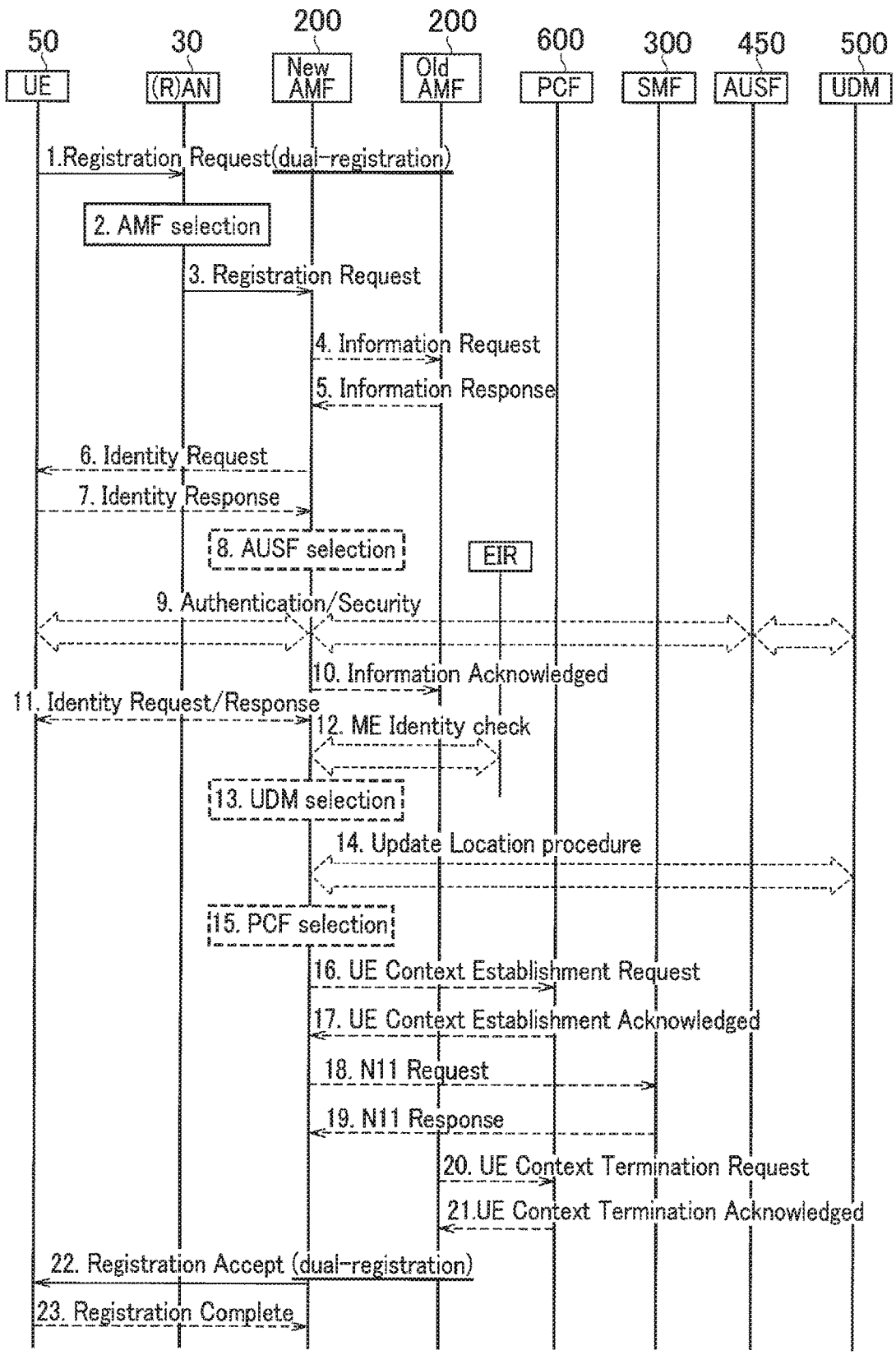
FIG. 8 is a diagram showing a communication sequence in which 5G RAN 30 is notified that the UE 50 has been dually registered (Operation Example 5).

A communication sequence in which the 5G RAN 30 is notified that the UE 50 has been dually registered (Operation Example 5) is shown in FIG. 8. The communication sequence shown in FIG. 8 is similar to that of the attach procedure (registration procedure) stipulated in Clause 4.2.2.2 of 3GPP TS 23.502 and the like. A part of the communication sequence that is different from the attach procedure is mainly explained below, and a part that is similar to the operation examples explained above is appropriately omitted.

As shown in FIG. 8, the AMF 200 transmits to the UE 50 the Registration Accept that includes the Dual registration indication via the 5G RAN 30 (Step 22).

Accordingly, when the AMF 200 transmits to the 5G RAN 30 the Registration Accept that includes the Dual registration indication, the 5G RAN 30 recognizes that the UE 50 has been dually registered and does not perform handover of the UE 50.

Alternatively, the AMF 200 can transmit to the UE 50 the Initial Context Setup Request (NAS Registration Accept) that includes the Dual registration indication.

(3.6) Operation Example 6 (Notifying 5G RAN 30 of Dual Registration)

Figure 9:
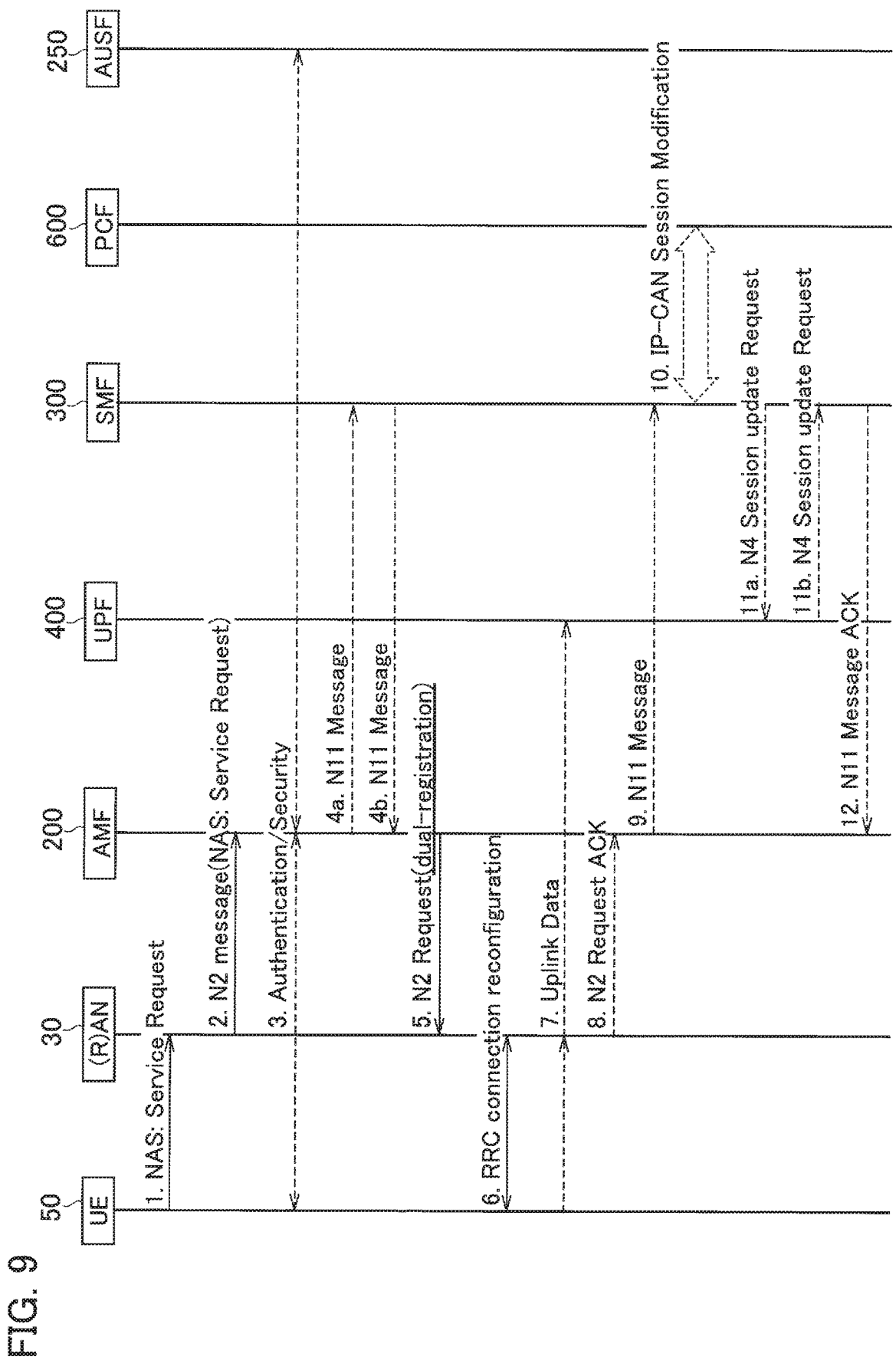
FIG. 9 is a diagram showing a communication sequence in which the 5G RAN 30 is notified that the UE 50 has been dually registered (Operation Example 6).

A communication sequence in which the 5G RAN 30 is notified that the UE 50 has been dually registered (Operation Example 6) is shown in FIG. 9. The communication sequence shown in FIG. 9 is similar to that of the service request procedure stipulated in Clause 4.2.3.2 of 3GPP TS 23.502 and the like. A part of the communication sequence that is different from the service request procedure is mainly explained below, and a part that is similar to the operation examples explained above is appropriately omitted.

As shown in FIG. 9, the AMF 200 transmits to the UE 50 the N2 Request that includes the Dual registration indication via the 5G RAN 30 (Step 5).

Accordingly, when the AMF 200 transmits to the 5G RAN 30 the N2 Request that includes the Dual registration indication, the 5G RAN 30 recognizes that the UE 50 has been dually registered and does not perform the handover of the UE (similar to Operation Example 5).

(4) Effects and Advantages

The following operational effects can be obtained with the embodiments explained above. Specifically, the MME 100 can transmit to the HSS 110 the Update Location Request that includes the Dual registration indication (see Operation Example 1). Moreover, the MME 100 can also stop notifying the HSS 110 the Initial Attach Indicator that indicates that the UE 50 is attached to the 4G/EPC.

Accordingly, the HSS 110 does not transmit the Cancel Location to the AMF 200. Accordingly, the registration of the UE 50 in the AMF 200 and the SMF/PGW-C 300 is maintained. In other words, according to the MME 100, when the Dual registration in which the UE 50 is simultaneously registered in the EPC and the 5GC is applied, the Dual registration can be maintained more reliably while utilizing the existing attach procedure of the UE 50.

Similarly, during the Update Location Procedure, the AMF 200 can transmit to the UDM 500 the Dual registration indication (see Operation Example 2). Moreover, the AMF 200 can also stop notifying the UDM 500 the Initial Attach Indicator that indicates that the UE 50 is attached to the 4G/EPC.

Accordingly, the UDM 500 does not transmit the Cancel Location of the UE 50 to the MME 100. Accordingly, the registration of the UE 50 in the EPC such as the MME 100 is maintained. In other words, according to the AMF 200, when the Dual registration in which the UE 50 is simultaneously registered in the EPC and the 5GC is applied, the Dual registration can be maintained more reliably while utilizing the existing attach procedure (registration procedure) of the UE 50.

In the present embodiment, when the UE 50 has been dually registered, the MME 100 can notify the E-UTRAN 20 of the Dual registration indication (see Operation Examples 3 and 4). Similarly, when the UE 50 has been dually registered, the AMF 200 can notify the 5G RAN 30 of the Dual registration indication (see Operation Examples 5 and 6).

Accordingly, the E-UTRAN 20 and the 5G RAN 30 recognize that the UE 50 has been dually registered, and do not perform the handover of the UE 50. On the other hand, when not notified of the Dual registration indication, the E-UTRAN 20 and the 5G RAN 30 can recognize that the UE 50 is singularly registered, and can perform the handover of the UE 50.

In other words, with such MME 100 and AMF 200, even when one UE to which Single registration is applied and one UE to which Dual registration is applied coexist, the radio access networks (E-UTRAN 20 and 5G RAN 30) can reliably determine whether the handover of the UE needs be performed (in the case of Single registration) or not be performed (in the case of Dual registration). Accordingly, even when the Dual registration is applied, a network behavior that is in accordance with a type of the UE 50 in the radio communication system 10 can be selected, making it possible to optimize the behavior of the radio communication system 10 as a whole.

(5) Other Embodiments

Although the contents of the present invention have been explained above by using the embodiments, it is obvious for a person skilled in the art that the present invention is not limited to those embodiments and that various modifications and improvements thereof are possible.

For example, the block diagrams used for explaining the embodiments (FIGS. 2 and 3) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 10:
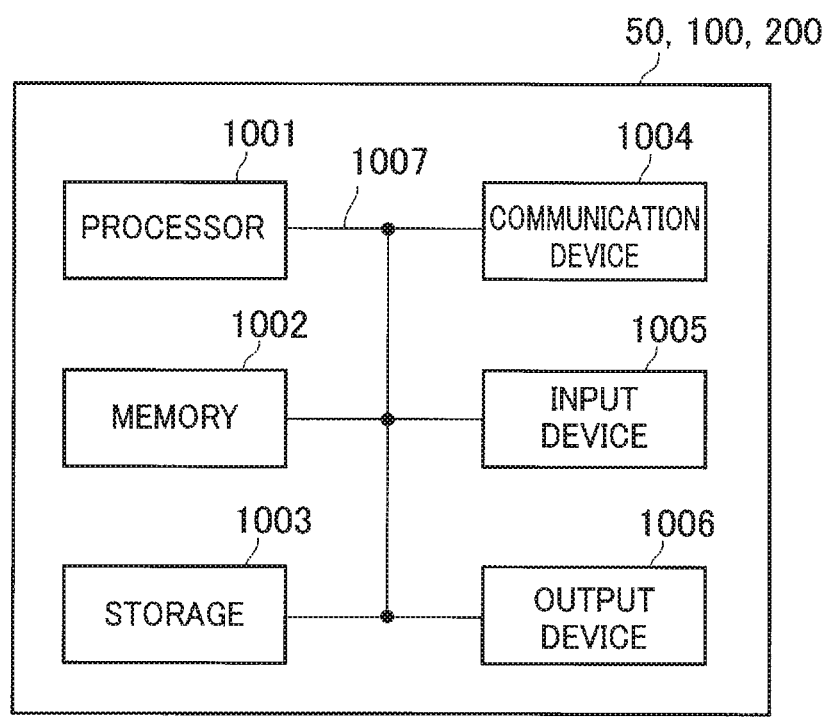
FIG. 10 is a diagram showing an example of hardware configuration of the UE 50, the MME 100, and AMF 200.

Furthermore, the UE 50, the MME 100, and the AMF 200 (devices) explained above can function as a computer that performs the processing of the present invention. FIG. 10 is a diagram showing an example of a hardware configuration of the devices. As shown in FIG. 10, each of the devices can be configured as a computer device including a processor 1001, a memory 1002, a storage 1003, a communication device 1004, an input device 1005, an output device 1006, and a bus 1007.

The functional blocks of the devices (see FIGS. 2 and 3) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the MME 100 and the AMF 200 can be performed by another network node (device). Moreover, functions of the MME 100 and the AMF 200 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The radio base stations 25 and 35 (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by abase station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, Node B, eNode B (eNB), gNode B (gNB), an access point, a femtocell, a small cell, and the like.

The UE 50 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

With the network device and the radio communication method explained above, the present invention is useful in that, when the Dual registration in which the user device is simultaneously registered in the EPC and the 5GC is applied, the Dual registration can be maintained more reliably while utilizing the existing attach procedure of the user device.

EXPLANATION OF REFERENCE NUMERALS

10 radio communication system
20 E-UTRAN
25 radio base station
30 5G RAN
35 radio base station
40 DN
50 UE
51 attach request processing unit
53 registration request processing unit
55 NAS service request processing unit
100 MME
101 attach processing unit
103 UE registration processing unit
110 HSS
120 EIR
150 SGW
200 AMF
250 AUSF
300 SMF/PGW-C
400 UPF/PGW-U
500 UDM 600 PCF/PCRF
1001 processor
1002 memory
1003 storage
1004 communication device
1005 input device
1006 output device
1007 bus

The invention claimed is:

1. A network device in a radio communication system that supports dual registration, wherein a user device in the radio communication system is simultaneously registered on a first communication network and a second communication network having a different communication scheme than that of the first communication network, the network device comprising:
 a receiver that acquires via the first communication network a message through which the user device requests to attach to the first communication network; and
 a transmitter, coupled to a processor, that notifies, after the message has been acquired by the receiver, another network device or the user device a dual registration indication that indicates that the user device supports dual registration,
 wherein the first communication network is an Evolved Packet Core (EPC) network, and the second communication network is a 5G Core (5GC) network.

2. A network device in a radio communication system that supports dual registration, wherein a user device in the radio communication system is simultaneously registered on a first communication network and a second communication network having a different communication scheme than that of the first communication network, the network device comprising:
 a receiver that acquires via the first communication network a message through which the user device requests to attach to the first communication network; and
 a transmitter, coupled to a processor, that, when the user device has been dually registered and the receiver has acquired the message, stops notifying another network device of a connection indication that indicates that the user device is connected to the first communication network,
 wherein the first communication network is an Evolved Packet Core (EPC) network, and the second communication network is a 5G Core (5GC) network.

3. A radio communication method that supports dual registration in which a user device is simultaneously registered on a first communication network and a second communication network having a different communication scheme than that of the first communication network, the radio communication method comprising:
 the user device requesting attach to the first communication network and transmitting to the first communication network a message; and
 the first communication network notifying, after the message has been acquired, a network device of a dual registration indication that indicates that the user device supports dual registration,
 wherein the first communication network is an Evolved Packet Core (EPC) network, and the second communication network is a 5G Core (5GC) network.

4. A radio communication method that supports dual registration in which a user device is simultaneously registered on a first communication network and a second communication network having a different communication scheme than that of the first communication network, the radio communication method comprising:
 the user device requesting attach to the first communication network and transmitting to the first communication network a message; and
 the first communication network stopping, after the message has been acquired, the notification to a network device of a connection indication that indicates that the user device is connected to the first communication network,
 wherein the first communication network is an Evolved Packet Core (EPC) network, and the second communication network is a 5G Core (5GC) network.

* * * * *